United States Patent
Takeda et al.

(10) Patent No.: US 7,688,751 B2
(45) Date of Patent: Mar. 30, 2010

(54) SERVER APPARATUS

(75) Inventors: Noboyuki Takeda, Hachioji (JP);
Fumikazu Matsukawa, Ome (JP);
Shinichi Kashimoto, Ome (JP); Shigeru Fukazawa, Hachioji (JP); Yasumasa Sasaki, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 11/723,325

(22) Filed: Mar. 19, 2007

(65) Prior Publication Data

US 2007/0230365 A1    Oct. 4, 2007

(30) Foreign Application Priority Data

Mar. 30, 2006    (JP) .............................. 2006-095784

(51) Int. Cl.
*G01R 31/08*    (2006.01)
(52) U.S. Cl. ...................... 370/252; 370/386; 370/352; 370/395.53; 370/232; 348/14.09; 348/14.11; 348/14.08; 709/219; 709/217; 709/218; 379/265.09; 379/219
(58) Field of Classification Search ........................ None
See application file for complete search history.

(56) References Cited

U.S. PATENT DOCUMENTS

| 6,014,694 | A | * | 1/2000 | Aharoni et al. ............. 709/219 |
| 2003/0025787 | A1 | * | 2/2003 | Stephens, Jr. ............ 348/14.09 |
| 2004/0008837 | A1 | * | 1/2004 | Sylvain ................. 379/265.09 |
| 2004/0066926 | A1 | * | 4/2004 | Brockbank et al. ...... 379/207.13 |
| 2004/0243629 | A1 |   | 12/2004 | Nomura et al. |
| 2004/0255031 | A1 |   | 12/2004 | Nomura et al. |
| 2004/0258052 | A1 | * | 12/2004 | Wakatsuki .................. 370/352 |
| 2005/0021829 | A1 |   | 1/2005 | Nomura et al. |
| 2005/0083922 | A1 | * | 4/2005 | Takai et al. ................. 370/386 |

FOREIGN PATENT DOCUMENTS

| JP | 2004-129205 | 4/2004 |
| JP | 2005-129981 | 5/2005 |

* cited by examiner

*Primary Examiner*—Chi H Pham
*Assistant Examiner*—Kouroush Mohebbi
(74) *Attorney, Agent, or Firm*—Pillsbury Winthrop Shaw Pittman, LLP

(57) ABSTRACT

According to one embodiment, a server apparatus includes a memory which stores a management table in which the user IDs are associated with communication bands and treatable data sizes in the communication network with one another, a comparator which refers to the management table in occurring communication requests, and compares respective communication bands and data sizes of a first and a second communication terminals to be objects of the data communication control out of the plurality of communication terminals based on the reference result, and a controller which decides communication bands and data sizes to be assigned between the first and the second communication terminals based on the comparison result from the comparator, and executes a data communication connection between the first and the second communication terminals by using the decided communication bands and the data sizes.

4 Claims, 6 Drawing Sheets

| User ID | Band | Video size |
|---------|---------|------------|
| A | 1.5Mbps | X |
| B | 128kbps | Y |
| C | 768kbps | Y |
| D | 1Mbps | X |
| E | 128kbps | Y |
| F | 768kbps | Y |
| G | 128kbps | Y |
| H | 1Mbps | X |
| I | 1.5Mbps | X |

SERVER APPARATUS

CROSS-REFERENCE TO RELATED APPLICATIONS

This application is based upon and claims the benefit of priority from Japanese Patent Application No. 2006-095784, filed Mar. 30, 2006, the entire contents of which are incorporated herein by reference.

BACKGROUND

1. Field

One embodiment of the present invention relates to a server apparatus for use in, for example, a visual communication system (VCS), etc.

2. Description of the Related Art

A local area network (LAN) system has been used in an office and a business establishment. This LAN system accommodates, for instance, telephone sets, as extension terminals, in a telephone exchange, such as a private branch exchange (PBX) and a key telephone apparatus, and enables speeches among the extension terminals and an outside line communication network, such as a public network, and among mutual extension terminals by switch-connecting through the telephone exchange.

Recently, a system has been proposed, wherein a server, with data terminals (hereinafter referred to as client terminal(s)), such as video phone terminals and personal computers connected thereto, is connected to the telephone exchange via a transmission line then a voice communication system using the telephone exchange and a data communication system using the server work together.

By the way, in the foregoing system in which the telephone exchange and the server are arranged in parallel with each other, a VCS also has been strongly desired, in which the VCS configures a video conference, etc., by making data communication connections among the client terminals work together with call states of the phone terminals. In a communication network among the server and a plurality of client terminals; however, video sizes or data sizes in transmissions, use time zones or use environments, etc. increases a processing load or a traffic load sometimes, and occurs an error in session establishment among client terminals sometimes.

Up to now, a method, in which the server acquires quality information (usable codec/band information) of the client terminals to accomplish the session establishment from each client terminal, calculates optimum bands to notify them to each client terminal, calculates optimum bands to notify them to each client terminal, and then, establishes sessions in optimum bands among the client terminals, has been proposed (for example, Jpn. Pat. Appln. KOKAI Publication No. 2005-129981).

However, in the method, the server executing a process from acquiring the quality information of the client terminals up to the session establishment among the client terminals, the processing load on the server becomes heavy. This fact becomes clearer as the scale of the VCS becomes larger.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a server apparatus which is connected to a communication network and executes data communication control among a plurality of communication terminals to which user IDs are assigned, respectively, comprising: a memory which stores a management table in which the user IDs are associated with communication bands and treatable data sizes in the communication network with one another; a comparator which refers to the management table in occurring communication requests, and compares respective communication bands and data sizes of a first and a second communication terminals to be objects of the data communication control out of the plurality of communication terminals based on the reference result; and a controller which decides communication bands and data sizes to be assigned between the first and the second communication terminals based on the comparison result from the comparator, and executes a data communication connection between the first and the second communication terminals by using the decided communication bands and the data sizes.

First Embodiment

Figure 1:
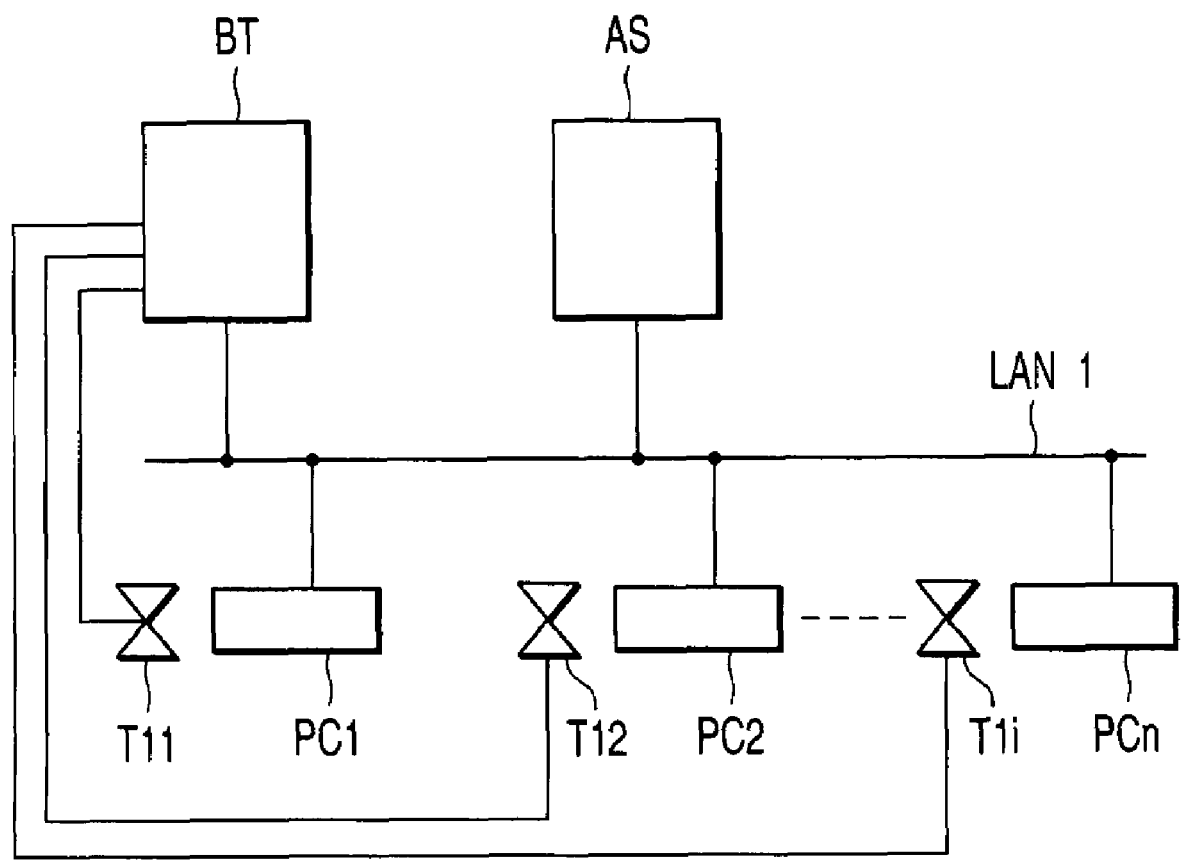
FIG. 1 is an exemplary schematic configuration view depicting a visual communication system (VCS) regarding a first embodiment of the present invention.

FIG. 1 is a schematic configuration illustrating a visual communication system (VCS) regarding a first embodiment of the invention.

The VCS, as shown in FIG. 1, includes a main apparatus BT, an application server AS, and a plurality of client terminals PC1 to PCn as communication terminals, and connects among the main apparatus BT, the application server AS, and the plurality of client terminals PC1 to PCn through a local area network (LAN) 1.

The main apparatus BT accommodates extension terminals T11 to T1i via extensions. The main apparatus BT executes switch processing among mutual extension terminals T11 to T1i, or among the extension terminals T11 to T1i and a public network (not shown).

The application server AS accommodates the plurality of client terminals PC1 to PCn via the LAN 1. Each of theses client terminals PC1 to PCn is composed of a general-purpose personal computer (PC), and operates with reference to each extension terminal T11 to T1i, respectively.

The application server AS executes additional functions for the main apparatus BT to process media information of, for instance, a video, etc.

Figure 2:
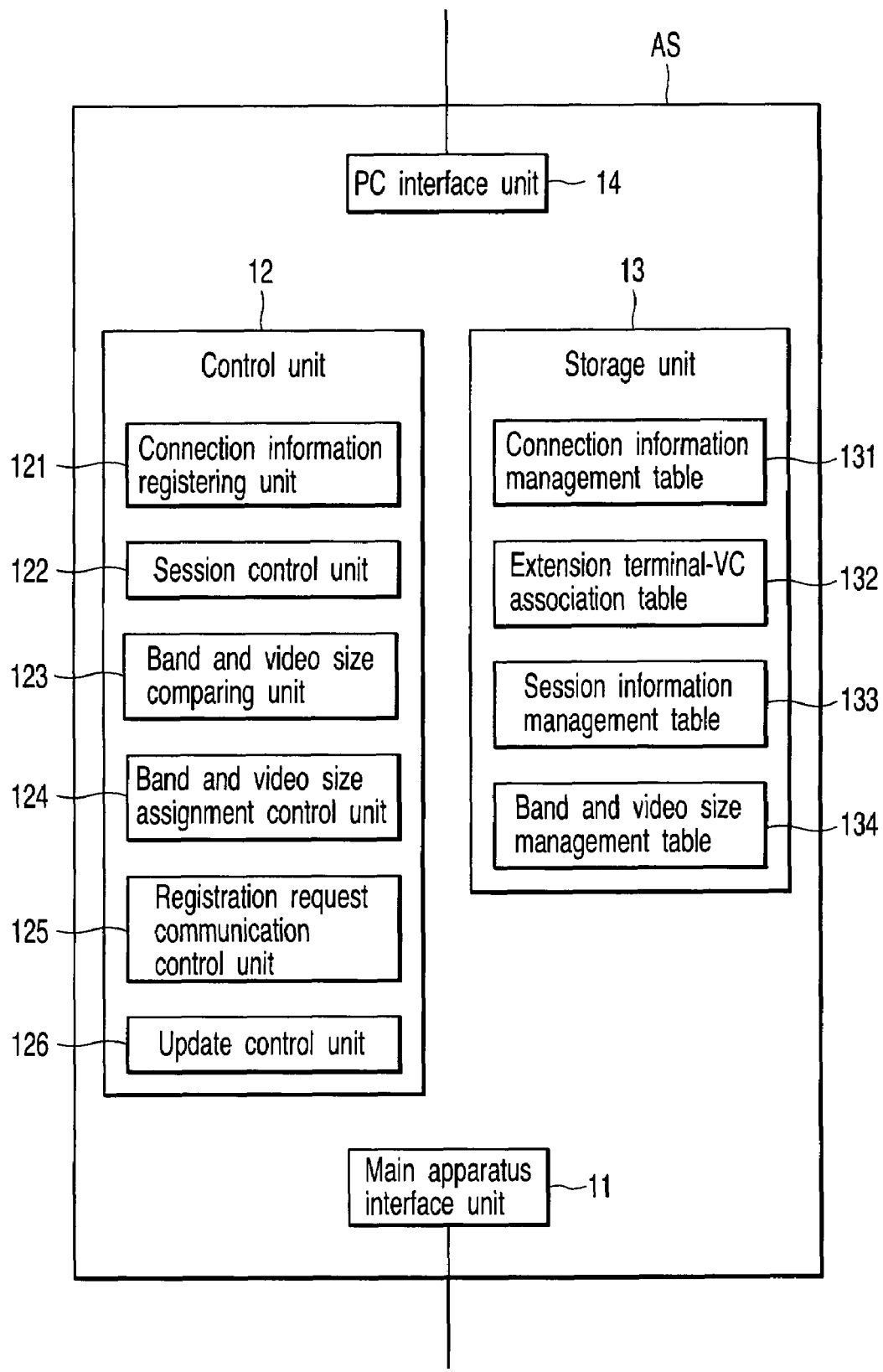
FIG. 2 is an exemplary block diagram depicting a functional configuration of an application server depicted in FIG. 1.

FIG. 2 is a block diagram illustrating a functional configuration of the application server AS.

The application server AS comprises a main apparatus interface unit 11, a control unit 12, a storage unit 13, and a PC interface unit 14. Among these components, the main apparatus interface unit 11 conducts interface processing to and from the main apparatus BT.

The PC interface unit 14 performs interface processing to and from the client terminals PC1 to PCn.

The storage unit 13 stores routing information, etc., necessary for connection control by the control unit 12. The storage unit 13 further includes a connection information management table 131 (hereinafter referred to as table 131), an extension terminal-client terminal (VC) association table 132 (hereinafter, referred to as table 132), a session information management table 133 (hereinafter referred to as table 133), and a band and video size management table 134 (hereinafter referred to as table 134).

Figure 3:
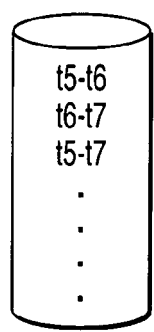
FIG. 3 is an exemplary view depicting an example of storage content in a connection information management table depicted in FIG. 2.

As shown in FIG. 3, the table 131 stores data indicating correspondence relations among each telephone number (phone ID) of the extension terminals T11 to T1i and state information showing connection states. The symbols t1 to t9 indicate each phone ID of the extension terminals T11 to T19, respectively. Here, to simplify a description, the extension terminals T11 to T1i are referred to as extension terminals T11 to T19.

Figure 4:
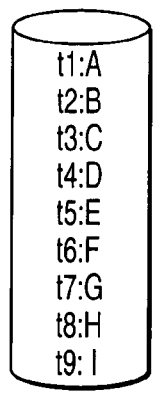
FIG. 4 is an exemplary view depicting an example of storage content in an extension terminal-client terminal (visual communication (VC)) association table depicted in FIG. 2.

As shown in FIG. 4, the table 132 stores data showing correspondence relations among the extension terminals T11 to T1i and the client terminal (VC) PC1 to PCn. In FIG. 4, the symbols A to I respectively indicate each user ID of the client terminals PC1 to PC9.

Figure 5:
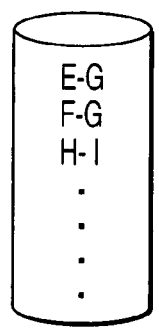
FIG. 5 is an exemplary view depicting an example of storage content in a session information management table depicted in FIG. 2.

As shown in FIG. 5, the table 133 stores information showing session states among the client terminals PC1 to PC9.

Figures 6, 7:
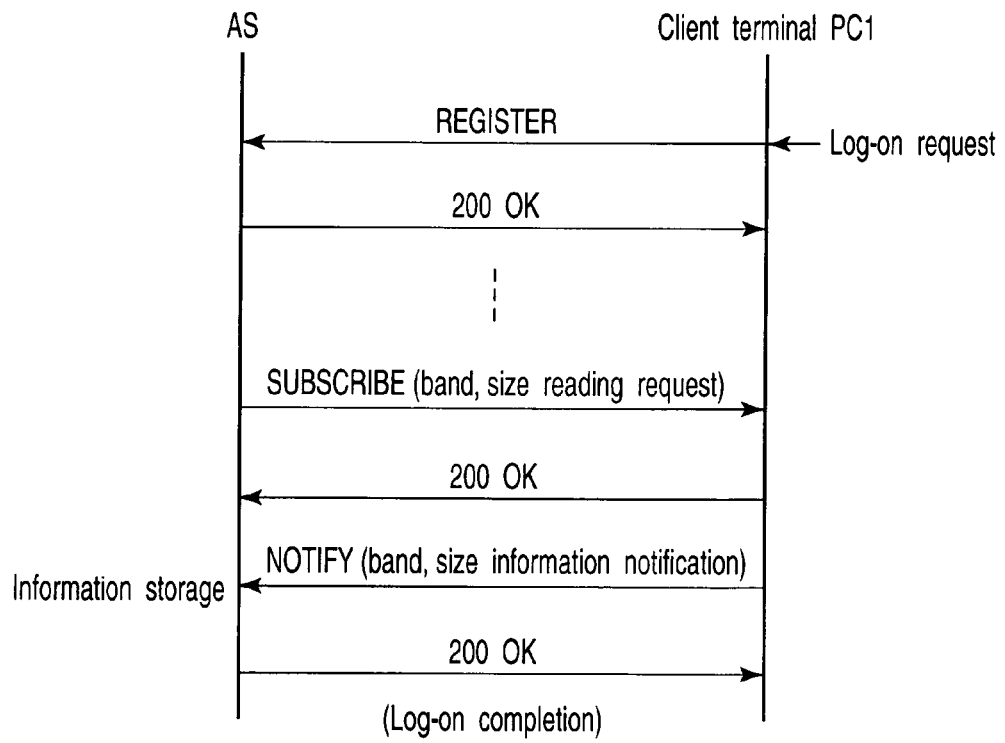
FIG. 6 is an exemplary view depicting an example of storage content in a band and video size management table depicted in FIG. 2.
FIG. 7 is an exemplary sequence view depicting transmitting/receiving operations of information among each client terminal and the application server in logging on in the first embodiment of the invention.

As shown in FIG. 6, the table 134 stores data indicating correspondence relations among each user ID of the client terminals PC1 to PCn, use bands in the LAN 1, and video sizes in communications.

On the other hand, the control unit 12 comprises a connection information registering unit 121 (hereinafter referred to as registering unit 121), a session control unit 122, a band and video size comparing unit 123 (hereinafter referred to as comparing unit 123), a band and video size assignment control unit 124 (hereinafter referred to as assignment control unit 124), a registration request communication control unit 125 (hereinafter referred to as communication control unit 125), and an update control unit 126, as new functions regarding the invention in addition to a control function related to state management of the client terminals PC1 to PCn and related to collaborative operations among the client terminals PC1 to PCn and the extension terminals T11 to T1i.

The registering unit 121 analyzes call information events notified from the main apparatus BT to determine the fact that, for instance, the extension terminal T15 and the extension terminal T16 have been brought into a speech, and adds state information "t5-t6" from the table 131.

The session control unit 122 reads out the fact that the extension terminal T15 is associated with the client terminal PC5 (E), and that the extension terminal T16 is associated with the client terminal PC6 (F) from the table 132, based on the updated state information, and retrieves the session state between the client terminals PC5 and PC6 from the table 133. For example, in the case of starting of a conversation from now, the session between the client terminals PC5 and PC6 not having been started yet, the session control unit 122 controls so that the client terminals PC5 and PC6 start the session. When the session therebetween is established, the session control unit 122 updates the storage content in the table 133.

On establishing the session between the client terminals PC5 and PC6 by the session control unit 122, the comparing unit 123 refers to the table 134, and reads out the band information and video size information corresponding to the client terminals PC5 and PC6 from the table 134 to compare them.

The assignment control unit 124 assigns a narrow band "128 kbps" and a small video size "Y" to the client terminals PC5 and PC6 from the comparison result by the comparing unit 123.

In the log-on of the client terminals PC5 and PC6, the communication control unit 125 makes communications among the client terminals PC1 to PCn via the LAN 1, and inserts reading requests for bands and video sizes into a "SUBSCRIBE" method to transmit them to the client terminals PC1 to PCn that are transmission sources in response to a "REGISTER" method in a session initiation protocol transmitted from the client terminals PC1 to PCn. The communication control unit 125 also receives a "NOTIFY" method including use band and video size information transmitted from the client terminals PC1 to PC6 in response to the reading requests, and associates the user IDs with the user band and video size information to register them in the table 134.

When a change request for a communication band and a data size, the update control unit 126 updates the storage content of the communication band and the data size of the corresponding user ID in the table 134.

Next, operations of the VCS configured as mentioned above will be described.

(Log-On)

FIG. 7 is a sequence view illustrating transmitting/receiving operations of information among each client terminal PC1 to PCn and the application server AS in logging on.

For instance, it is presumed that a user has used the client terminal PC1 and logged on to the application server AS. At that time, the client terminal PC1 notifying the information on the use band and the video size to the application server AS, here, the client terminals PC1 has used the SIP.

On logging on, the client terminal PC1 sends the "REGISTER" method to the application server AS. The application server AS then sends a "200 OK" response to the client terminal PC1.

After sending and receiving some SIPs, the application server AS sends the "SUBSCRIBE" method to the client terminal PC1. This method includes the reading request for the user band and the video size to the client terminal PC1.

When receiving the "SUBSCRIBE" method, the client terminal PC1 returns the "200 OK" response to the application server AS, and further, sends the "NOTIFY" method with the information on the use bands and the video sizes mentioned therein to the application server AS.

When receiving the "NOTIFY" method, the application server AS returns the "200 OK" response to the client terminal PC1, and further, stores the user ID, user band and video size in the table 134.

(Change in Band and Video Size)

Figure 8:
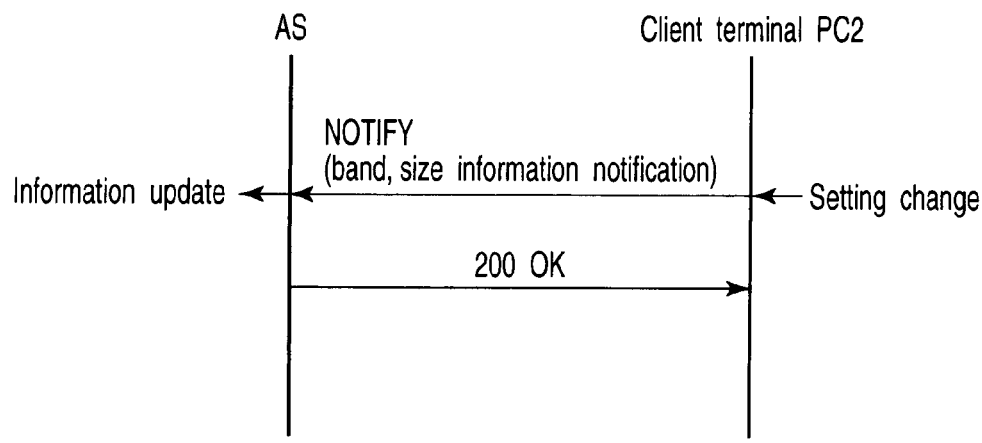
FIG. 8 is an exemplary sequence view depicting transmitting/receiving operations of information among each client terminal and the application server in changing bands and video sizes in the first embodiment of the invention.

FIG. 8 is a sequence view illustrating transmitting/receiving operations of the information among each client terminals PC1 to PCn and the application server AS in changing the bands and video sizes thereof.

It is presumed that the user has performed a change request operation of the use band and video size to the application server AS by using the client terminal PC2. The client terminal PC2 then transmits the "NOTIFY" method with the use band and the video size information mentioned therein to the application server AS.

When receiving the "NOTIFY" method, the application server AS returns the "200 OK" response to the client PC2, and further, updates the use band and the video size corresponding to the user ID "B" of the client terminal PC2 in the table 134.

(Two-Party Speech)

Figure 9:
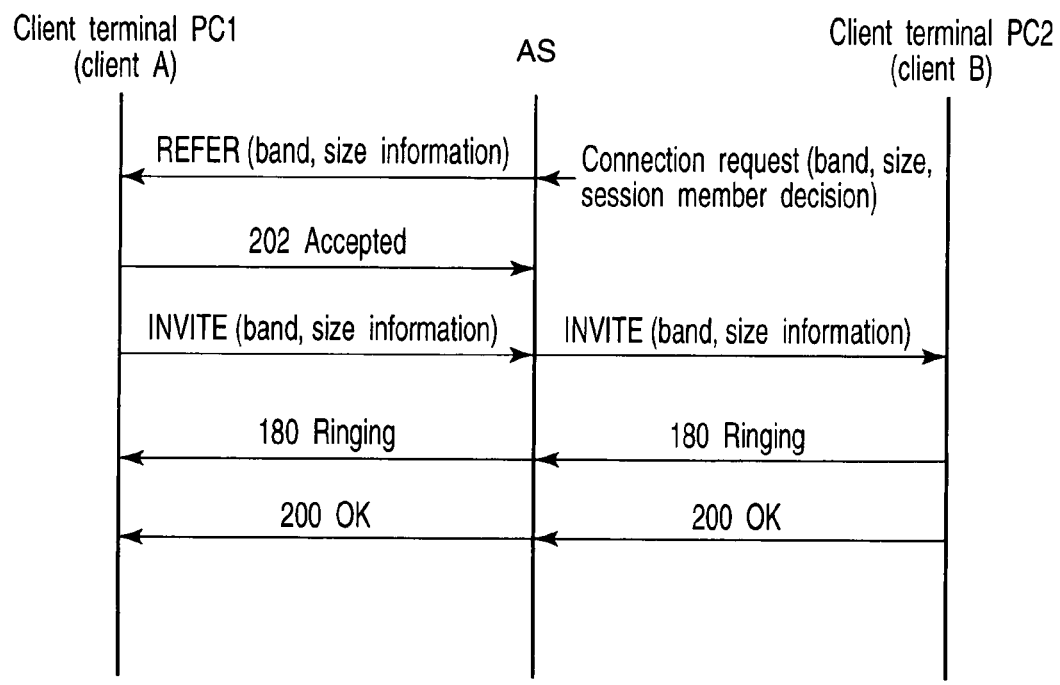
FIG. 9 is an exemplary sequence view depicting transmitting/receiving operations of information between a client terminal and the application server in a two-party speech in the first embodiment of the invention.

FIG. 9 is a sequence view illustrating transmitting/receiving operations of the information among the client terminals PC1, PC2 and the application server AS in the speech between the extension terminal T11 and the extension terminal T12.

For example, in the extension terminal T11, it is assumed that the user requires a speech to the extension terminal T12. The extension terminal T11 then sends its request signal to the main apparatus BT. When receiving this request signal for communication establishment, the main apparatus BT calls out the extension terminal T12 that is an incoming call destination. When the extension terminal T12 responds to this calling out, the main apparatus BT forms a communication link between the extension terminals T11 and T12, and transmits a call information event, indicating the fact that the extension terminals T11 and T12 are in a conversation, to the application server AS.

When receiving the call information event, the application server AS associates the phone IDs (t1 and t2) of the extension terminals T11 and T12 included in this call information event with each other to store them in the table 131.

The application server AS then refers to the table 132 to recognize the client terminals PC1 and PC2 associated with the extension terminals T11 and T12, respectively, and acquires those items of the information on the use bands and the video sizes from the table 134.

The application server AS compares the acquired information with each other to decide a value of narrower use band and a value of smaller video size out of two pieces of the acquired information. Here, the application server AS decides a use band of "128 kbps" and a video size of "Y".

The application server AS sends a "REFER" method with information of the session members, use bands and video sizes decided in the foregoing manner put therein to the client terminal PC1.

When receiving the "REFER" method, the client terminal PC1 returns a "202 Accepted" response to the application server AS, and also recognizes the session partner, user band and video size. The client terminal PC1 further transmits an "INVITE" method with information on the user band and the video size mentioned therein to the client terminal PC2 that is the session partner through the application server AS.

When receiving the "INVITE" method, the client terminal PC2 recognizes the session partner, and the use band and the video size to use in this session. The client terminal PC2 returns a "180 Ringing" response to the client terminal PC1 through the application server AS.

When the client terminal PC1 receives this "180 Ringing" response, the client terminal PC1 stops to retransmit the "INVITE" method.

The client terminal PC2 returns a "200 OK" response to the client terminal PC1 via the application server AS.

When the client terminal PC2 receives this "200 OK" response, a video session between the client terminal PC1 and the client terminal PC2 is started. The use band and the video size of the video session are decided in a manner given above. Thus, a video communication of a two-party speech between two parties may be made.

As mentioned above, in the first embodiment, the application server AS stores the table 134, in which each user ID of the client terminals PC1 and PCn is associated with the use bands usable by the client terminals PC1 to PCn and with the video sizes treatable thereby, in the storage 13 to manage it. When receiving the call information event indicating the call connection between the extension terminals T11 and T12 from the main apparatus BT, the application server AS compares between each user band and video size of the client terminals PC1 and PC2, respectively, and decides the use band and the video size to use for the session establishment by using the information on the client terminals PC1 and PC2 associated with the extension terminals T11 and T12 in the table 134.

Accordingly, the application server AS may perform the session establishment between the client terminals PC1 and PC2 with a simple procedure and with an appropriate use band and a video size without having to acquire the information on the use band and the video size from the client terminals PC1 and PC2 for every reception of the call information events from the main apparatus BT.

In the first embodiment, in logging on, for every arrival of the "REGISTER" methods from the client terminals PC1 to PCn, the application server AS registers the use bands and the video sizes by automatically associating them with the user IDs into the table 134. Therefore, manual operations of an operator of the application server AS may be omitted in registration processing.

Moreover, in the first embodiment, the application server AS automatically updates the corresponding use bands and video sizes in the table 134 upon reaching the "NOTIFY" method including the information on the use bands and the video sizes in setting of changes in band and video size. Thereby, the application server AS may eliminate the manual operations of the operator thereof in the update processing.

Second Embodiment

Figure 10:
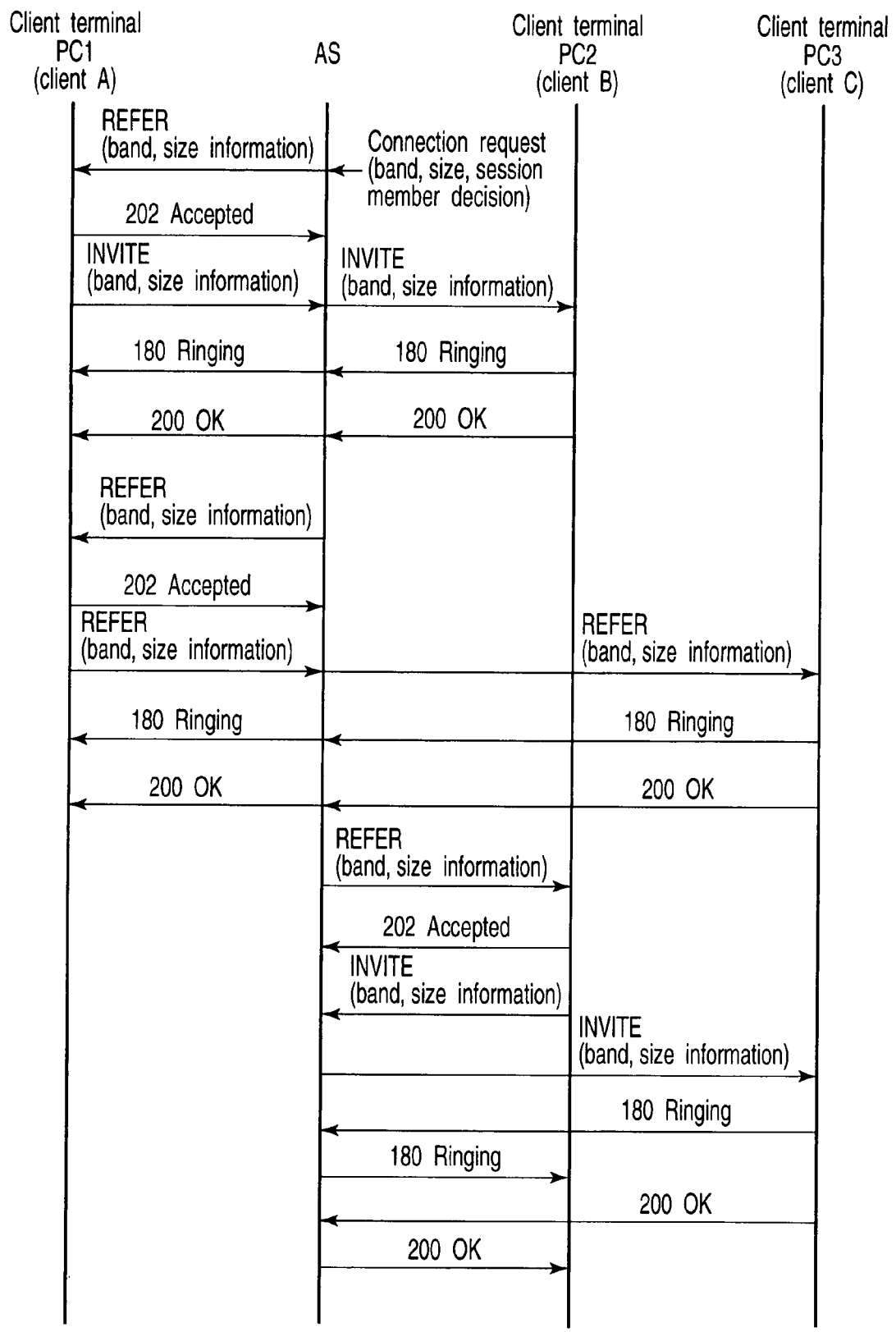
FIG. 10 is an exemplary sequence view depicting transmitting/receiving operations of information among client terminals and the application server in a three-party speech as a second embodiment of the invention

FIG. 10 is a sequence view illustrating transmitting/receiving operations of the information among the client terminals PC1, PC2 and PC3 and the application server AS in a three-party speech, as a second embodiment of the present invention.

For instance, when the three-party speech among the extension terminals T11, T12 and T13 is made, the application server AS recognizes the client terminals PC1, PC2 and PC3 associated with each terminal as session members, and acquires the information on the user bands, video sizes from the table 134.

The application server AS compares the acquired information to decide the value of the nearest use band and the value of the smallest video size out of the values in regard to the three client terminals PC1 to PC3.

The application server AS sends the "REFER" method with the information about the session members, use bands, and video sizes which have decided in the given manner mentioned therein to the client terminal PC1.

When receiving a "REFER" method, the client terminal PC1 returns a "202 Accepted" response to the application server AS, and also recognizes a session partner, use band and video size. Furthermore, the client terminal PC1 transmits an "INVITE" method with the use band and video size information put therein to the client terminal PC2 that is the session partner via the application server AS.

When receiving the "INVITE" method, the client terminal PC2 recognizes the session partner, and the use band and the video size to be used for this session, the client terminal PC2 returns a "180 Ringing" response to the client terminal PC1 through the application server AS.

The client terminal PC1 which has received this "180 Ringing" response stops to retransmit the "INVITE" method.

The client terminal PC2 returns a "200 OK" response to the client terminal PC1 through the application server AS.

Receiving this "200 OK" response by the client terminal PC1 starts the video session between the client terminal PC1 and the client terminal PC2. The use band and the video size for this video session have been decided in the way described above.

In terms of the session between the client terminal PC1 and the client terminal PC3 is also performed in the like way mentioned above.

Further, in regard with the session between the client terminal PC2 and the client terminal PC3 is also conducted in the same manner as that given above. Thereby, a three-party video communication may be made in a three-party conference.

Other Embodiment

The present invention is not limited to each of the forgoing embodiments. Each embodiment given above having described about the example to separately dispose the main apparatus and the application server, the function of the main apparatus may be built in the application server.

Each of the aforementioned embodiments having described about the example to decide the user band and the video size for making the video communication of the video, etc., the present invention is not limited to this, and may decide a use band and a video size for making a data communication of other than the video.

In addition, as for the type and configuration of the system (not limited to visual communication system (VCS) and other communication system is usable), the configuration and the type of the application server, the type of the telephone exchange (not limited to main apparatus, but PBX is usable), the type of the extension terminal, the type of the client terminal, the storage contents of a variety of tables, the control method of the sessions among client terminals, and the deciding method of the bands and video sizes, and the like may be embodied in various forms without departing from the spirit or scope general inventive concept thereof.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A server apparatus which is connected to a communication network and executes data communication control among a plurality of communication terminals to which user IDs are assigned, respectively, comprising:
    an interface which connects with a telephone exchange apparatus which executes call connections among a plurality of phone terminals,
    a receiver which receives call information event including telephone IDs specifying a plurality of telephone terminals to which call connections are established from the telephone exchange apparatus via the interface;
    a memory which stores a associating table in which user IDs assigned to the plurality of communication terminals are associated with the telephone IDs of the plurality of telephone terminals and stores a management table in which the user IDs are associated with communication bands and with treatable data sizes in the communication network;
    a comparator which refers to the associating table and the management table upon receipt of the call information event, and compares respective communication bands and data sizes of a plurality of communication terminals associated with the telephone IDs included in the call information event based on the reference results; and
    a controller which decides communication bands and data sizes to be assigned between the plurality of communication terminals based on the comparison result from the comparator, and executes a data communication connection between the plurality of communication terminals by using the decided communication bands and the data sizes.

2. The server apparatus according to claim 1, wherein the controller decides the narrowest communication band and the smallest data size based on the comparison result.

3. The server apparatus according to claim 1, further comprising:
    a transmitter which transmits acquiring requests for the communication bands and the data sizes to communication terminals of request sources, via the communication network, when registration requests arrive from the corresponding communication terminals in connecting the communication terminals to the communication network; and
    a processor which receives information showing communication bands and data sizes transmitted from the communication terminals via the communication network to the transmissions of the requiring requests, and stores the information showing the corresponding communication bands and the data sizes in the management table by associating them with user IDs of the communication terminals of the request sources.

4. The server apparatus according to claim 1, further comprising an updater which updates storage content of the communication bands and the data sizes of the corresponding user IDs in the management table, when change requests for the communication bands and the data sizes arrive.

* * * * *

UNITED STATES PATENT AND TRADEMARK OFFICE
CERTIFICATE OF CORRECTION

PATENT NO.       : 7,688,751 B2                                                      Page 1 of 1
APPLICATION NO.  : 11/723325
DATED            : March 30, 2010
INVENTOR(S)      : Nobuyuki Takeda et al.

It is certified that error appears in the above-identified patent and that said Letters Patent is hereby corrected as shown below:

On title page, item 75 Inventor
replace "Noboyuki Takeda"
with --Nobuyuki Takeda--.

Signed and Sealed this

Thirteenth Day of July, 2010

David J. Kappos
*Director of the United States Patent and Trademark Office*